United States Patent
Ikeda et al.

(10) Patent No.: US 11,640,091 B2
(45) Date of Patent: May 2, 2023

(54) DISPLAY DEVICE

(71) Applicant: Japan Display Inc., Tokyo (JP)

(72) Inventors: Kojiro Ikeda, Tokyo (JP); Tenfu Nakamura, Tokyo (JP); Kentaro Okuyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/656,279

(22) Filed: Mar. 24, 2022

(65) Prior Publication Data
US 2022/0214588 A1    Jul. 7, 2022

Related U.S. Application Data

(63) Continuation of application No. PCT/JP2020/030390, filed on Aug. 7, 2020.

(30) Foreign Application Priority Data

Sep. 27, 2019    (JP) .............................. JP2019-177244

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01); *G02F 1/136227* (2013.01)

(58) Field of Classification Search
CPC .................................................. G02F 1/1362
See application file for complete search history.

(56) References Cited

U.S. PATENT DOCUMENTS

| 2010/0085510 A1 | 4/2010 | Okuyama et al. |
| 2015/0185572 A1* | 7/2015 | Han ................... G02F 1/136286 349/42 |
| 2016/0070047 A1* | 3/2016 | Okuyama .............. G09G 3/342 349/71 |
| 2018/0329238 A1* | 11/2018 | Koyama ............... G02F 1/1337 |

FOREIGN PATENT DOCUMENTS

| JP | 2010-92682 A | 4/2010 |
| JP | 2016-57338 A | 4/2016 |

* cited by examiner

*Primary Examiner* — Sang V Nguyen
(74) *Attorney, Agent, or Firm* — Maier & Maier, PLLC

(57) ABSTRACT

According to one embodiment, a display device includes a first substrate, a second substrate, a liquid crystal layer which includes a stripe-like polymer and first liquid crystal molecules having responsiveness to an electric field, a light source and a transparent film which includes second liquid crystal molecules which are not responsive to an electric field. The second liquid crystal molecules have a large inclination angle with respect to the horizontal plane of the transparent film in a first region that is separate from the light source, and have, in a second region positioned between the light source and the first region, a smaller inclination angle than the inclination angle in the first region with respect to the horizontal plane of the transparent film.

7 Claims, 12 Drawing Sheets

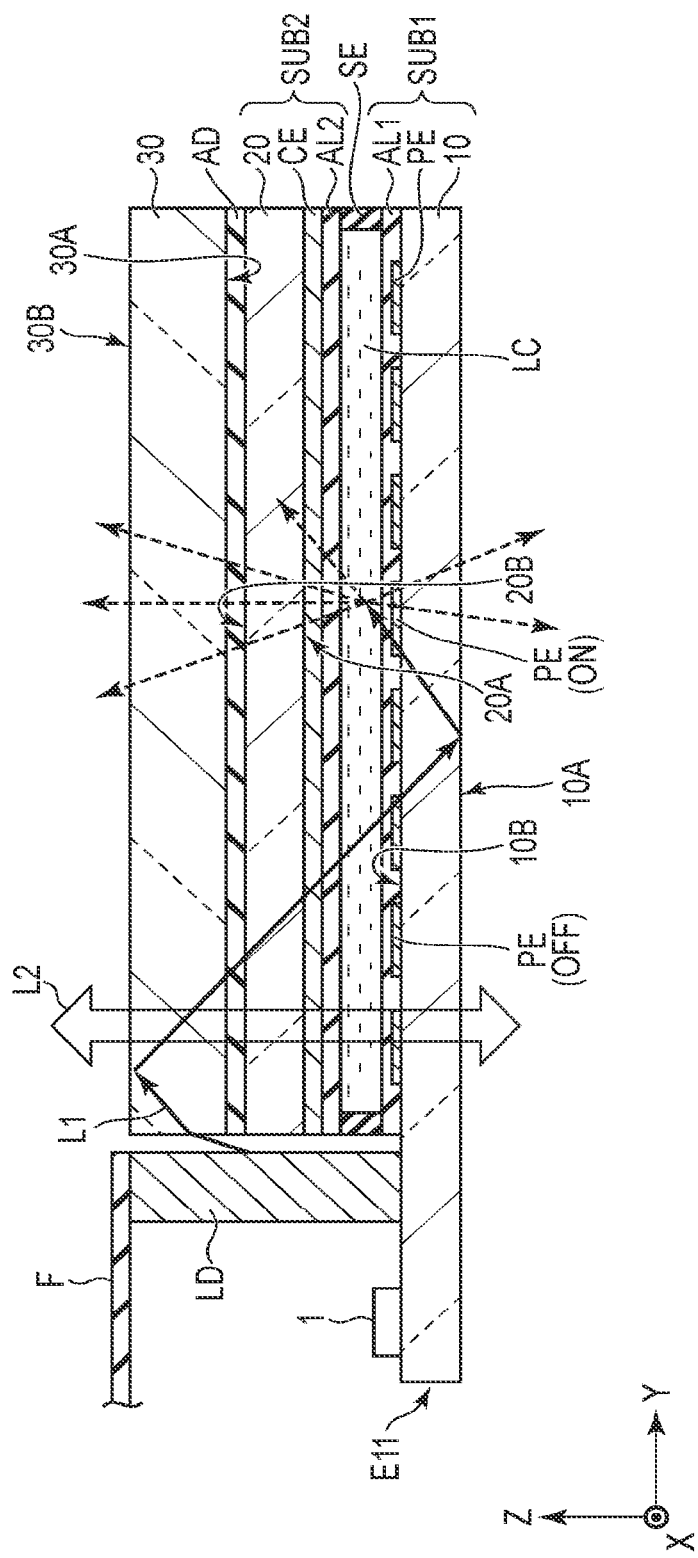
F I G. 3

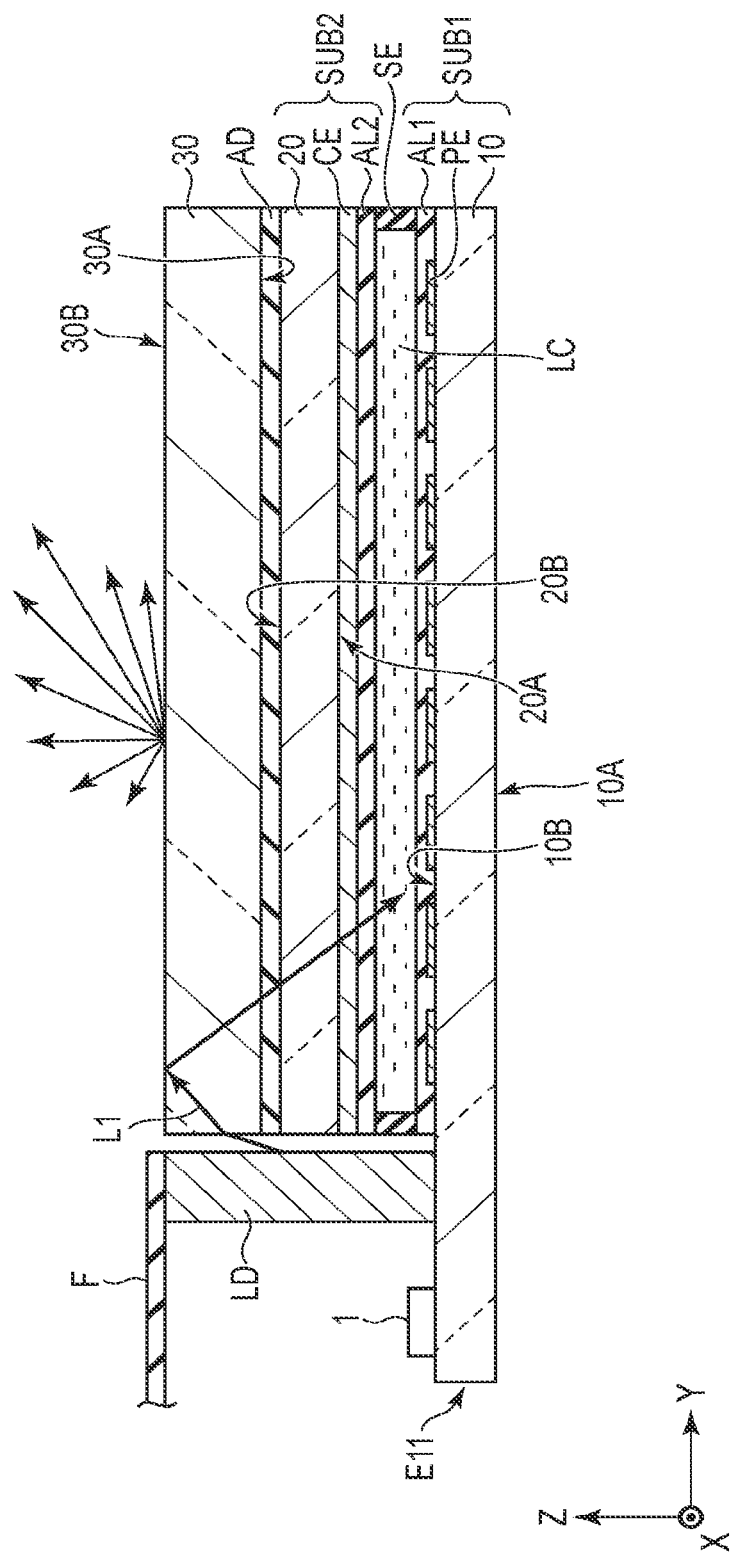
F I G. 4

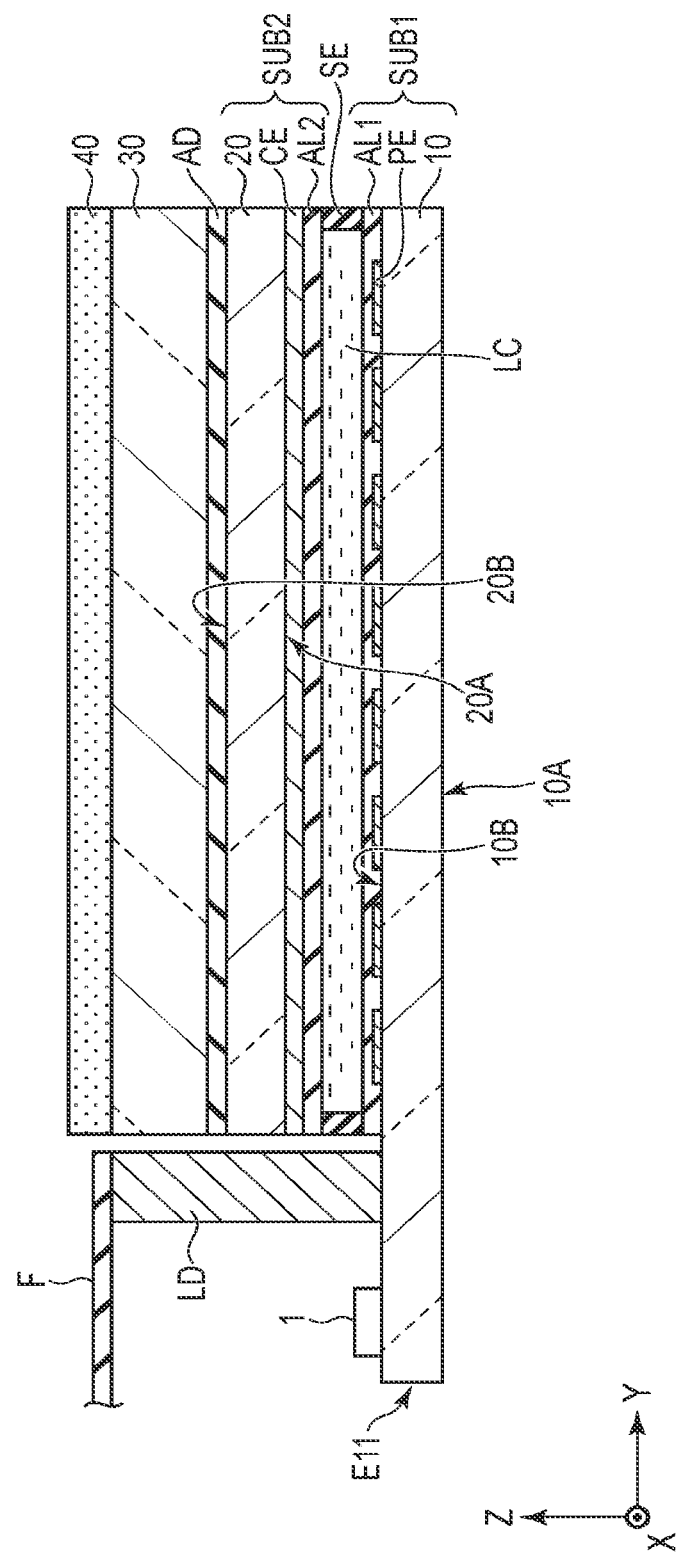
F I G. 6

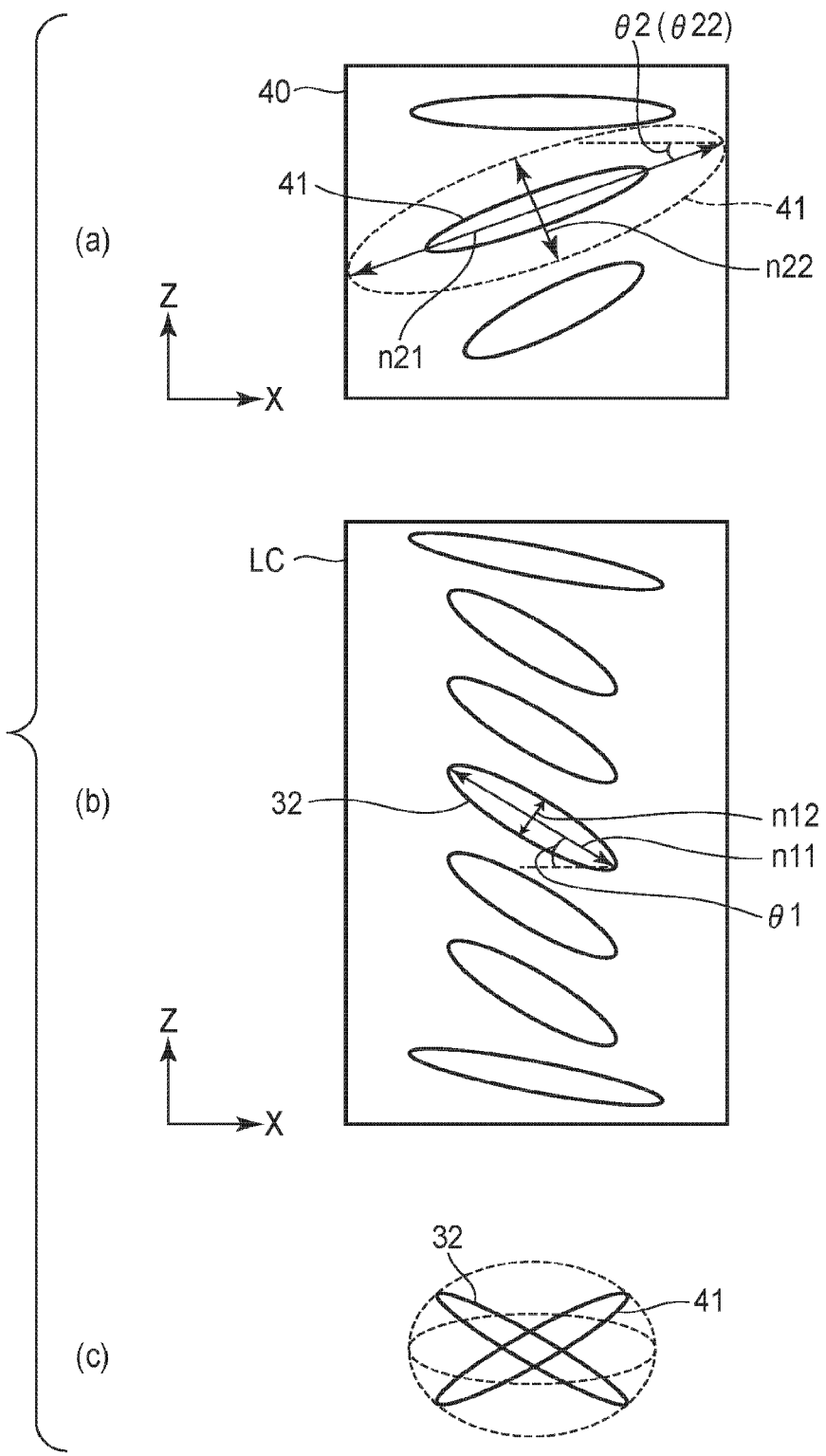
F I G. 8

DISPLAY DEVICE

CROSS-REFERENCE TO RELATED APPLICATIONS

This application is a Continuation Application of PCT Application No. PCT/JP2020/030390, filed Aug. 7, 2020 and based upon and claiming the benefit of priority from Japanese Patent Application No. 2019-177244, filed Sep. 27, 2019, the entire contents of all of which are incorporated herein by reference.

FIELD

Embodiments described herein relate generally to a display device.

BACKGROUND

In recent years, a display device comprising a light source, a pair of substrates including a pixel electrode and a common electrode, and a polymer dispersed liquid crystal layer arranged between these substrates has been known. For example, the polymer dispersed liquid crystal layer contains streaky polymers and liquid crystal molecules.

In the polymer dispersed liquid crystal layer, the inclination of the optical axes of the liquid crystal molecules to the optical axis of the polymer can be controlled by rotating the liquid crystal molecules by the electric field between the pixel electrode and the common electrode. It is thereby possible to control the degree of scattering of light from the light source for each pixel and display arbitrary video (image) on the display device.

BRIEF DESCRIPTION OF THE DRAWINGS

FIG. 3 is a cross-sectional view showing a configuration example applicable to the display device according to the embodiments.

FIG. 4 is a view schematically illustrating the scattering brightness in the display device according to the embodiments.

FIG. 6 is a cross-sectional view showing a configuration example of the display device in which the compensation film according to the embodiments is arranged.

FIG. 8 is a schematic view showing an example of a cross section of the display device cut along line C-D line shown in FIG. 5.

DETAILED DESCRIPTION

Figure 1:
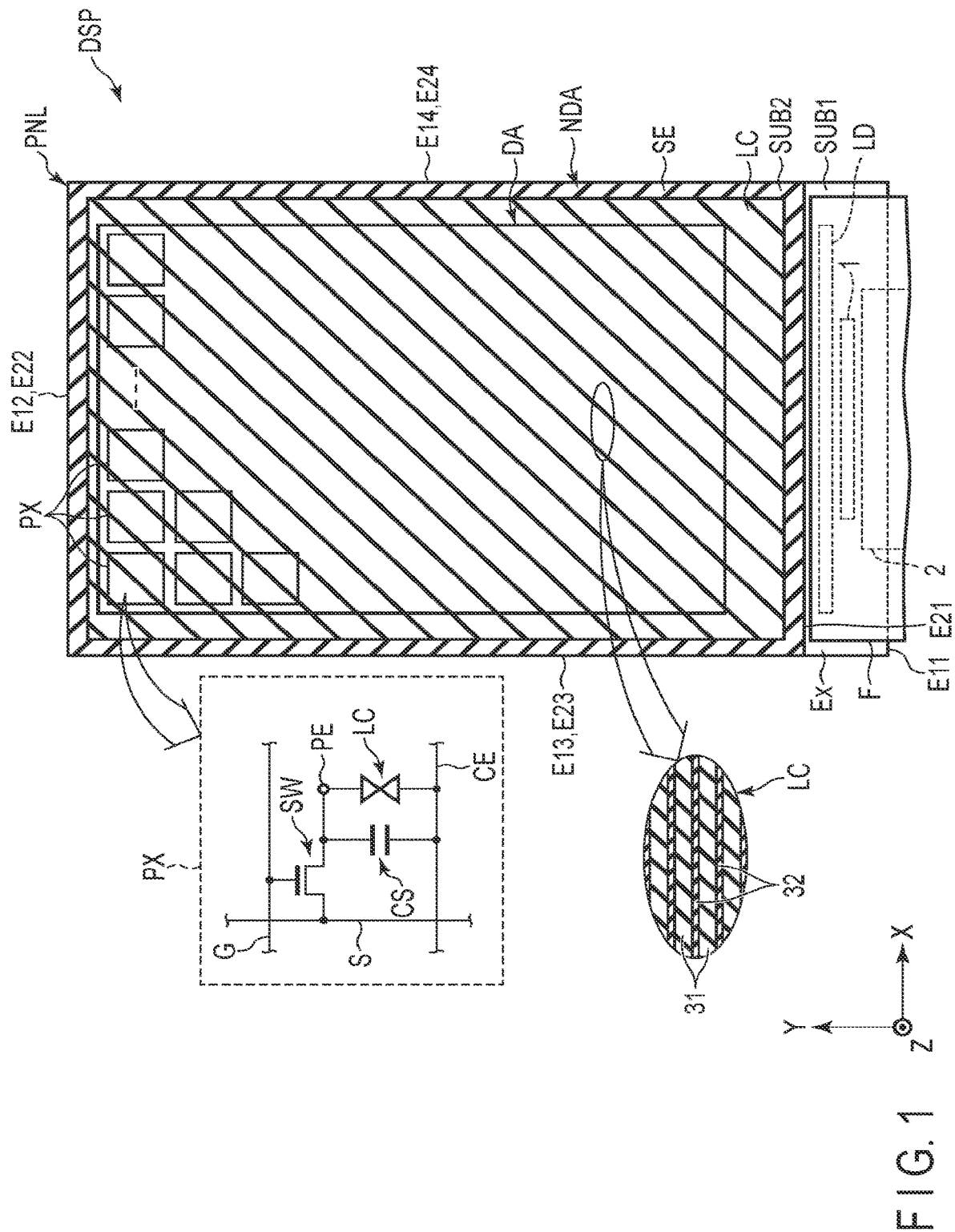
FIG. 1 is a plan view showing a configuration example of a display device according to embodiments.

In general, according to one embodiment, there is provided a display device comprising: a first substrate comprising a first transparent substrate, a scanning line, a signal line intersecting the scanning line, a switching element electrically connected to the scanning line and the signal line, and a pixel electrode electrically connected to the switching element; a second substrate comprising a second transparent substrate and a common electrode opposed to the pixel electrode; a liquid crystal layer held between the first substrate and the second substrate, and containing streaky polymer and a first liquid crystal molecule having responsiveness to an electric field; a light source emitting light propagating inside the first substrate, the second substrate, and the liquid crystal layer; and a transparent film arranged in at least one of an emission surface of light emitted from the first substrate side and an emission surface of light emitted from the second substrate side, and containing a second liquid crystal molecule having no responsiveness to the electric field, in the second liquid crystal molecule, a tilt angle to a horizontal plane of the transparent film being large in a first region far from the light source, and the tilt angle to the horizontal plane of the transparent film being smaller than the tilt angle of the first region in a second region located between the light source and the first region.

According to another embodiment, there is provided a display device comprising: a first substrate comprising a first transparent substrate, a scanning line, a signal line intersecting the scanning line, a switching element electrically connected to the scanning line and the signal line, and a pixel electrode electrically connected to the switching element; a second substrate comprising a second transparent substrate and a common electrode opposed to the pixel electrode; a liquid crystal layer held between the first substrate and the second substrate, and containing streaky polymer and a first liquid crystal molecule having responsiveness to an electric field; a light source emitting light propagating inside the first substrate, the second substrate, and the liquid crystal layer; and a transparent film arranged in at least one of an emission surface of light emitted from the first substrate side and an emission surface of light emitted from the second substrate side, and uniquely containing a second liquid crystal molecule having no responsiveness to the electric field, in the second liquid crystal molecule, a refractive ellipsoid based on the first liquid crystal molecule and the second liquid crystal molecule showing a spherical structure when the electric field occurs.

Various embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings are illustrated schematically, rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

FIG. 1 is a plan view showing a configuration example of a display device DSP of the embodiments. For example, the first direction X, the second direction Y, and the third direction Z are orthogonal to each other but may intersect at an angle other than 90 degrees. The first direction X and the second direction Y correspond to the directions parallel to the surface of a substrate which constitutes the display device DSP, and the third direction Z corresponds to the thickness direction of the display device DSP. In the present specification, a direction from a first substrate SUB1 to a second substrate SUB2 is referred to as an upward direction (or, more simply, upwardly) and a direction from the second substrate SUB2 to the first substrate SUB1 is referred to as a downward direction (or, more simply, downwardly). According to "a second member on/above a first member" and "a second member under/below a first member", the second member may be in contact with the first member or may be remote from the first member. In addition, an observation position at which the display device DSP is observed is assumed to be located on the tip side of the arrow indicating the third direction Z, and viewing from the observation position toward the X-Y plane defined by the first direction X and the second direction Y is called a planar view.

In the embodiments, a liquid crystal display device employing polymer dispersed liquid crystal will be described as an example of the display device DSP. The display device DSP comprises a display panel PNL, a light source LD, a wiring board F, an IC chip 1, and a wiring board 2.

The display panel PNL comprises a first substrate SUB1, a second substrate SUB2, a liquid crystal layer LC, and a seal SE. The first substrate SUB1 and the second substrate SUB2 are formed in a flat plate parallel to the X-Y plane. The first substrate SUB1 and the second substrate SUB2 are overlaid in planar view. The first substrate SUB1 and the second substrate SUB2 are bonded to each other by a seal SE. The liquid crystal layer LC is held between the first substrate SUB1 and the second substrate SUB2 and is sealed by a seal SE. In FIG. 1, the liquid crystal layer LC and the seal SE are represented by different oblique lines.

As schematically enlarged in FIG. 1, the liquid crystal layer LC comprises polymer dispersed liquid crystal containing polymer 31 and liquid crystal molecules 32 (first liquid crystal molecules). For example, the polymer 31 is liquid crystal polymer. The polymer 31 is formed in a streaky shape extending in the first direction X. The liquid crystal molecules 32 are dispersed in gaps of the polymer 31 and aligned such that their major axes extend in the first direction X. The polymer 31 and the liquid crystal molecules 32 have optical anisotropy or refractive anisotropy. The responsiveness of the polymer 31 to the electric field is lower than the responsiveness of the liquid crystal molecules 32 to the electric field.

For example, the orientation of alignment of the polymer 31 is hardly varied irrespective of the presence or absence of the electric field. In contrast, the orientation of alignment of the liquid crystal molecules 32 is varied in accordance with the electric field in a state in which a voltage higher than or equal to the threshold value is applied to the liquid crystal layer LC. In a state in which the voltage is not applied to the liquid crystal layer LC, optical axes of the polymer 31 and the liquid crystal molecules 32 are parallel to one another and the light made incident on the liquid crystal layer LC is not substantially scattered in the liquid crystal layer LC and transmitted (transparent state). In a state in which the voltage is applied to the liquid crystal layer LC, the optical axes of the polymer 31 and the liquid crystal molecules 32 intersect one another and the light made incident on the liquid crystal layer LC is scattered in the liquid crystal layer LC (scattered state).

The display panel PNL comprises a display portion DA where an image is displayed and a non-display portion NDA in a frame shape surrounding the display portion DA. The seal SE is located at the non-display portion NDA. The display portion DA comprises pixels PX arrayed in a matrix in the first direction X and the second direction Y.

As shown and enlarged in FIG. 1, each pixel PX comprises a switching element SW, a pixel electrode PE, a common electrode CE, a liquid crystal layer LC, and the like. The switching element SW is formed of, for example, a thin-film transistor (TFT) and is electrically connected to a scanning line G and a signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. Each pixel electrode PE is opposed to the common electrode CE, and drives the liquid crystal layer LC (particularly, liquid crystal molecules 32) by an electric field produced between the pixel electrode PE and the common electrode CE. For example, a capacitor CS is formed between an electrode having the same electric potential as the common electrode CE and an electrode having the same potential as the pixel electrode PE.

The first substrate SUB1 has edge portions E11 and 512 extending in the first direction X, and edge portions E13 and E14 extending in the second direction Y. The second substrate SUB2 has edge portions E21 and E22 extending in the first direction X, and edge portions E23 and E24 extending in the second direction Y. In the example shown in FIG. 1, the edge portions E12 and E22, the edge portions E13 and E23, and the edge portions E14 and E24 are overlaid on each other, but may not be overlaid, in planar view. The edge portion E21 is located between the edge portion E11 and the display portion DA in planar view. The first substrate SUB1 has an extended portion Ex between the edge portion E11 and the edge portion E21.

Figure 2:
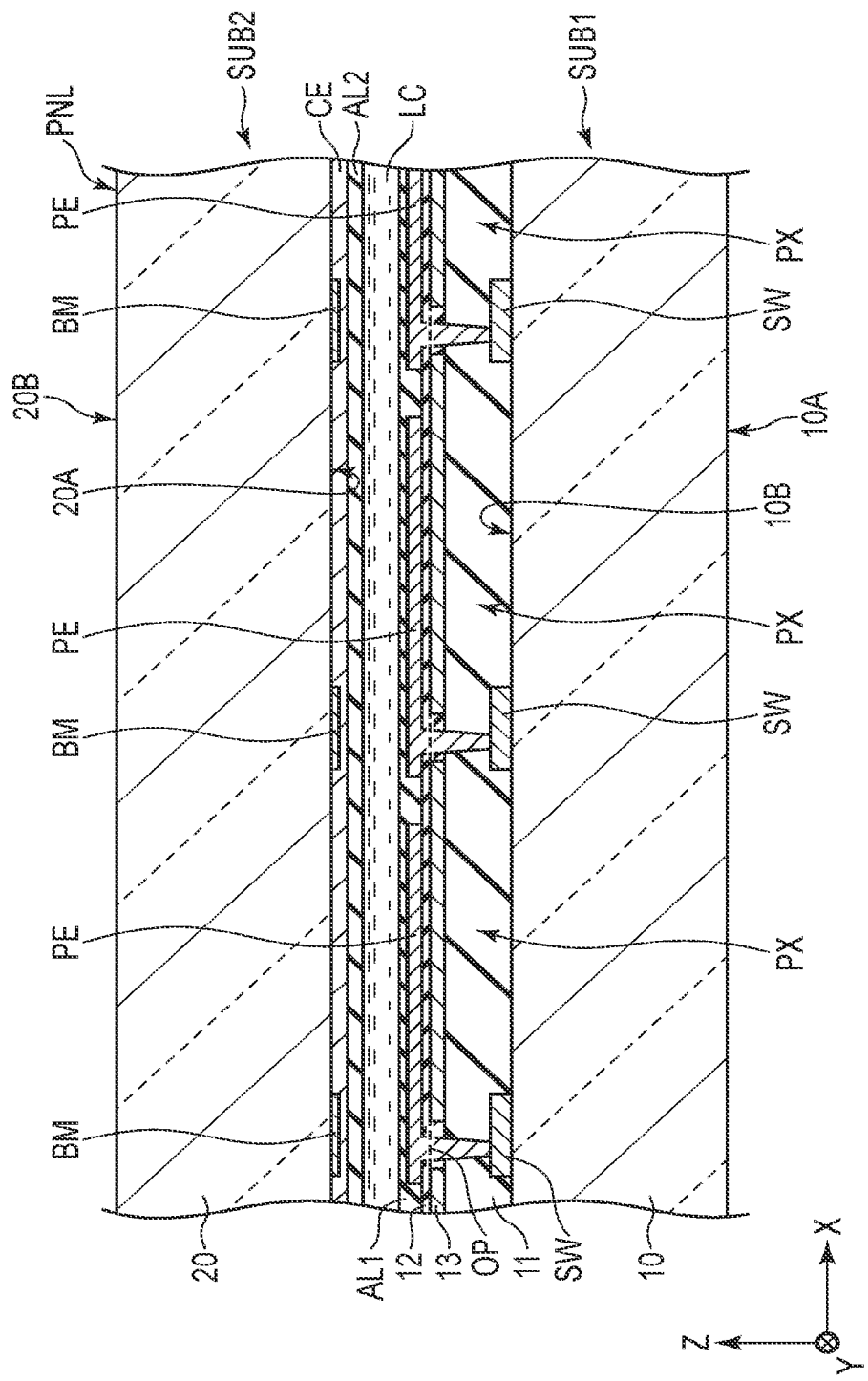
FIG. 2 is a cross-sectional view showing a configuration example of the display device according to the embodiments.

FIG. 2 is a cross-sectional view showing a configuration example of the display panel PNL shown in FIG. 1. The first substrate SUB1 comprises a transparent substrate 10 (first transparent substrate), insulating films 11 and 12, a capacitive electrode 13, the switching elements SW, the pixel electrodes PE, and an alignment film AL1. The first substrate SUB1 further comprises the scanning line G and the signal line S shown in FIG. 1. The transparent substrate 10 comprises a main surface (lower surface) 10A and a main surface (upper surface) 10B on a side opposite to the main surface 10A. The switching elements SW are arranged on the main surface 10B. The insulating film 11 covers the switching elements SW. The capacitive electrode 13 is located between the insulating films 11 and 12. The pixel electrodes PE are arranged for the respective pixels PX on the insulating film 12. The pixel electrodes PE are electrically connected to the switching elements SW through opening portions OP of the capacitive electrode 13. The pixel electrodes PE are overlaid on the capacitive electrode 13 through the insulating film 12, and produce the capacitors CS of the pixels PX. The alignment film AL1 covers the pixel electrodes PE.

The second substrate SUB2 comprises a transparent substrate 20 (second transparent substrate), light-shielding layers BM, the common electrode CE, and the alignment film AL2. The transparent substrate 20 comprises a main surface (lower surface) 20A and a main surface (upper surface) 20B on a side opposite to the main surface 20A. The main surface 20A of the transparent substrate 20 is opposed to the main surface 10B of the transparent substrate 10. The light-shielding layers BM and the common electrode CE are arranged on the main surface 20A. For example, the light-shielding layers BM are located just above the switching elements SW and just above the scanning lines G and the signal lines S (not shown), respectively. The common electrode CE is arranged across the plurality of pixels PX to directly cover the light-shielding layers BM. The common electrode CE is electrically connected to the capacitive electrode 13 and has the same electric potential as the capacitive electrode 13. The alignment film AL2 covers the common electrode CE.

The liquid crystal layer LC is located between the main surface 10B and the main surface 20A and is in contact with the alignment films AL1 and AL2. In the first substrate SUB1, the insulating films 11 and 12, the capacitive electrode 13, the switching elements SW, the pixel electrodes PE, and the alignment film AL1 are located between the main surface 10B and the liquid crystal layer LC. In the second substrate SUB2, the light-shielding layers BM, the common electrode CE, and the alignment film AL2 are located between the main surface 20A and the liquid crystal layer LC.

The transparent substrates 10 and 20 are insulating substrates such as glass substrates or plastic substrates. The main surfaces 10A and 10B, and the main surfaces 20A and 20B are the surfaces substantially parallel to the X-Y plane. The insulating film 11 is formed of a transparent resin material such as a silicon oxide, a silicon nitride, a silicon oxynitride or an acrylic resin. For example, the insulating film 11 includes an inorganic insulating film and an organic insulating film. The insulating film 12 is an inorganic insulating film of a silicon nitride or the like. The capacitive electrode 13, the pixel electrodes PE, and the common electrode CE are transparent electrodes formed of a transparent conductive material such as indium tin oxide (ITO) or indium zinc oxide (IZO). The light-shielding layers BM are, for example, conductive layers having resistance lower than the common electrode CE. For example, the light-shielding layers BM are formed of a non-transparent metal material such as molybdenum, aluminum, tungsten, titanium, or silver. The alignment films AL1 and AL2 are horizontal alignment films having an alignment restriction force substantially parallel to the X-Y plane. For example, the alignment films AL1 and AL2 are subjected to an alignment treatment in the first direction X. The alignment treatment may be a rubbing treatment or an optical alignment treatment.

FIG. 3 is a schematic cross-sectional view showing an example of a configuration applicable to the display device DSP. As shown in FIG. 3, a cover member 30 formed of, for example, glass is adhered to the main surface 20B of the second substrate SUB2 by a transparent adhesive layer AD. The light source LD is arranged at the extended portion Ex and mainly faces side surfaces of the second substrate SUB2 and the cover member 30. FIG. 3 shows an example that the light source LD faces a part of the side surface of the first substrate SUB1, but the light source LD may face the entire side surface of the first substrate SUB1. That is, the light source LD may be arranged in a place other than the extended portion Ex. In addition, the light source LD is connected to the wiring board F.

As shown in FIG. 3, light L1 emitted from the light source LD is applied to the side surfaces of the second substrate SUB2 and the cover member 30. The light L1 entering the inside of the display panel PNL from these side surfaces propagates inside the display panel PNL. The light L1 is hardly scattered by the liquid crystal layer LC, in the vicinity of the pixel electrode PE (OFF in FIG. 3) to which the transparent voltage is applied. For this reason, the light L1 hardly leaks from the first substrate SUB1 and the second substrate SUB2.

In contrast, the light L1 is scattered by the liquid crystal layer LC, in the vicinity of the pixel electrode PE (ON in FIG. 3) to which the scattering voltage is applied. This scattered light is emitted from the first substrate SUB1 and the second substrate SUB2 and is visually recognized as a display image. Gradation expression of the scattering brightness can also be implemented by defining the scattering voltage stepwise within a predetermined range.

External light L2 made incident on the first substrate SUB1 or the second substrate SUB2 is hardly scattered but transmitted through these substrates, in the vicinity of the pixel electrode PE to which the transparent voltage is applied. That is, the background on the first substrate SUB1 side can be visually recognized when the display panel PNL is viewed from the second substrate SUB2 side, and the background on the second substrate SUB2 side can be visually recognized when the display panel PNL is viewed from the first substrate SUB1 side.

The display device DSP having the above configuration can be driven by, for example, a field sequential system. In this method, one frame period includes a plurality of sub-frame periods (fields). For example, if the light source LD includes red, green, and blue light emitting elements, one frame period includes red, green, and blue sub-frame periods.

During the red sub-frame period, the red light emitting element is turned on and a voltage corresponding to the red image data is applied to each pixel electrode PE. A red image is thereby displayed. Similarly, during the green and blue sub-frame periods, the green and blue light emitting elements are turned on, and voltages corresponding to the green and blue image data are applied to each pixel electrode PE. Green and blue images are thereby displayed. The red, green, and blue images thus displayed in time division are synthesized with each other and visually recognized by the observer as a multicolor display image.

The liquid crystal layer LC may be in a scattered state when a voltage similar to the common voltage is applied to the pixel electrode PE, and may be in a transparent state when a voltage sufficiently different from the common voltage is applied to the pixel electrode PE. In addition, the display device DSP may be configured to display a single-color image.

FIG. 4 is a view schematically illustrating the scattering brightness in the display device DSP. The scattering brightness of the scattered light scattered by the liquid crystal layer LC and emitted from the first substrate SUB1 and the second substrate SUB2 has a characteristic of being higher in the traveling direction of the light L1 emitted from the light source LD, and lower in a direction opposite to the traveling direction of the light L1 emitted from the light source LD as shown in FIG. 4. According to this, the image is visually recognized brightly when the image is observed from the direction of high scattering brightness by the observer, and the image is visually recognized dark when the image is observed from the direction of low scattering brightness. Thus, it is not very desirable for the observer that the image looks bright or dark depending on the observation orientation.

For this reason, in the display device DSP according to the embodiments, a compensation film (transparent film) for suppressing a change in scattering brightness according to the observation orientation is arranged. The compensation film will be mainly described below.

Figure 5:
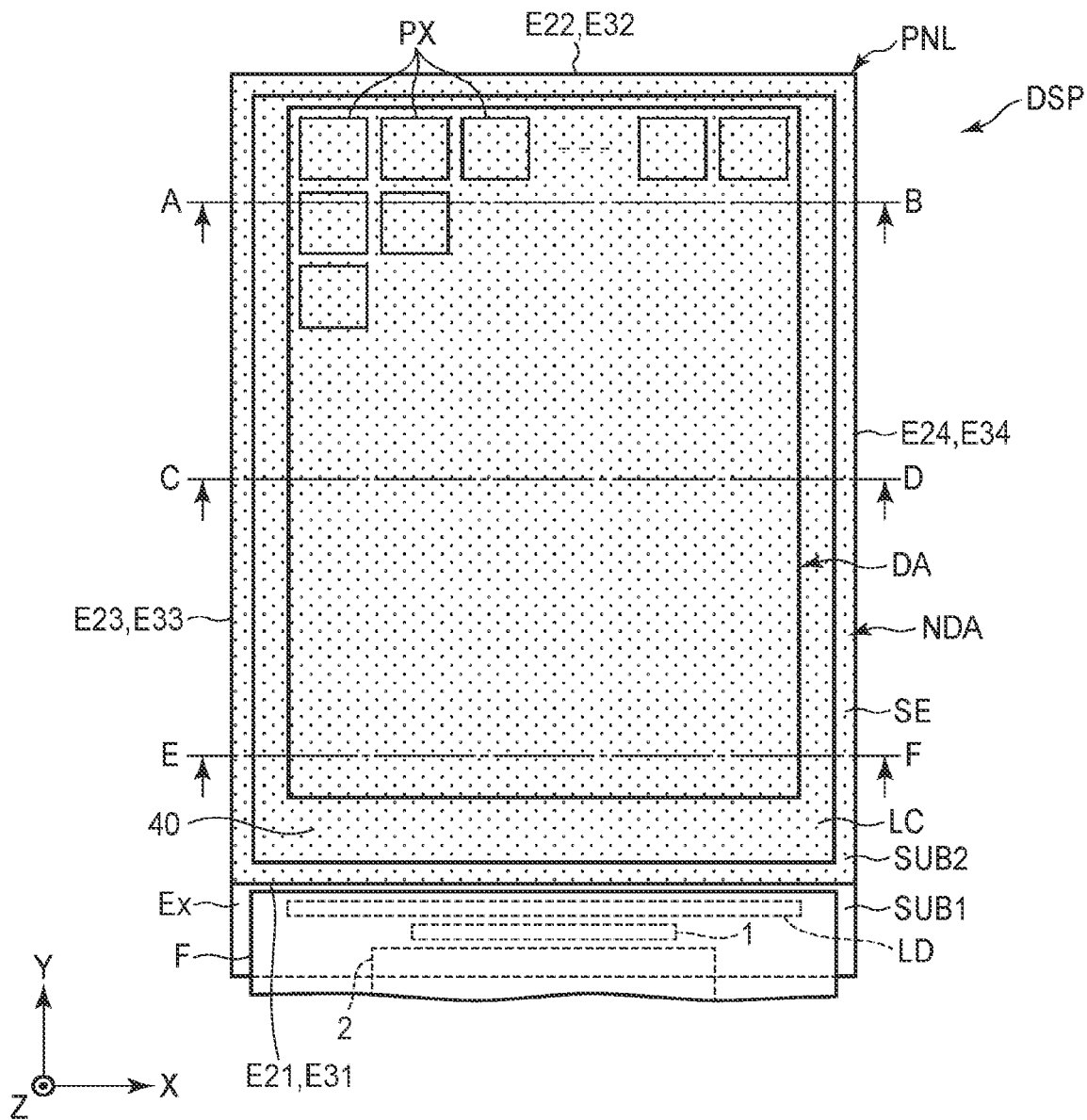
FIG. 5 is a plan view showing a configuration example of a display device in which a compensation film according to the embodiments is arranged.

FIG. 5 is a plan view showing a configuration example of the display device DSP on which the compensation film 40 is arranged. As shown in FIG. 5, the compensation film 40 is overlaid on the second substrate SUB2 in planar view. The compensation film 40 contains rod-shaped liquid crystal molecules that are not responsive to an electric field, which will be described later in detail. That is, the liquid crystal molecules are fixed in the film in a desired alignment state. The liquid crystal molecules contained in the compensation film 40, which are not responsive to an electric field may be a flat plate-shaped discotic liquid crystal. The compensating film 40 has edges E31 and E32 extending along the first direction X and edges E33 and E34 extending along the second direction Y. In the example shown in FIG. 5, in planar view, the edges E21 to E24 of the second substrate SUB2 and the edges E31 to E34 of the compensation film 40 are overlaid, respectively, but the invention is not limited to this and the edges E21 to E24 of the second substrate SUB2 and the edges E31 to E34 of the compensation film 40 may not be overlaid, respectively. In addition, FIG. 5 illustrates an example that the compensation film 40 is overlaid on the second substrate SUB2, but the invention is not limited to this and the compensating film 40 may be provided to be overlaid on at least the liquid crystal layer LC in planar view.

FIG. 6 is a schematic cross-sectional view showing an example of a configuration applicable to the display device DSP on which the compensation film 40 is arranged. As shown in FIG. 6, the compensation film 40 is arranged on the upper surface (main surface 30B) of the cover member 30. FIG. 6 illustrates an example that the compensation film 40 is provided on the upper surface of the cover member 30, but the present invention is not limited to this and the compensation film 40 may be provided on the lower surface (main surface 10A) of the transparent substrate 10 or may be provided on both the upper surface of the cover member 30 and the lower surface of the transparent substrate 10. Alternatively, the compensation film 40 may be provided on the upper surface (main surface 20B) of the transparent substrate 20. In other words, the compensation film 40 may be provided on at least one of the emission surfaces of the scattered light emitted from the display device DSP.

Figure 7:
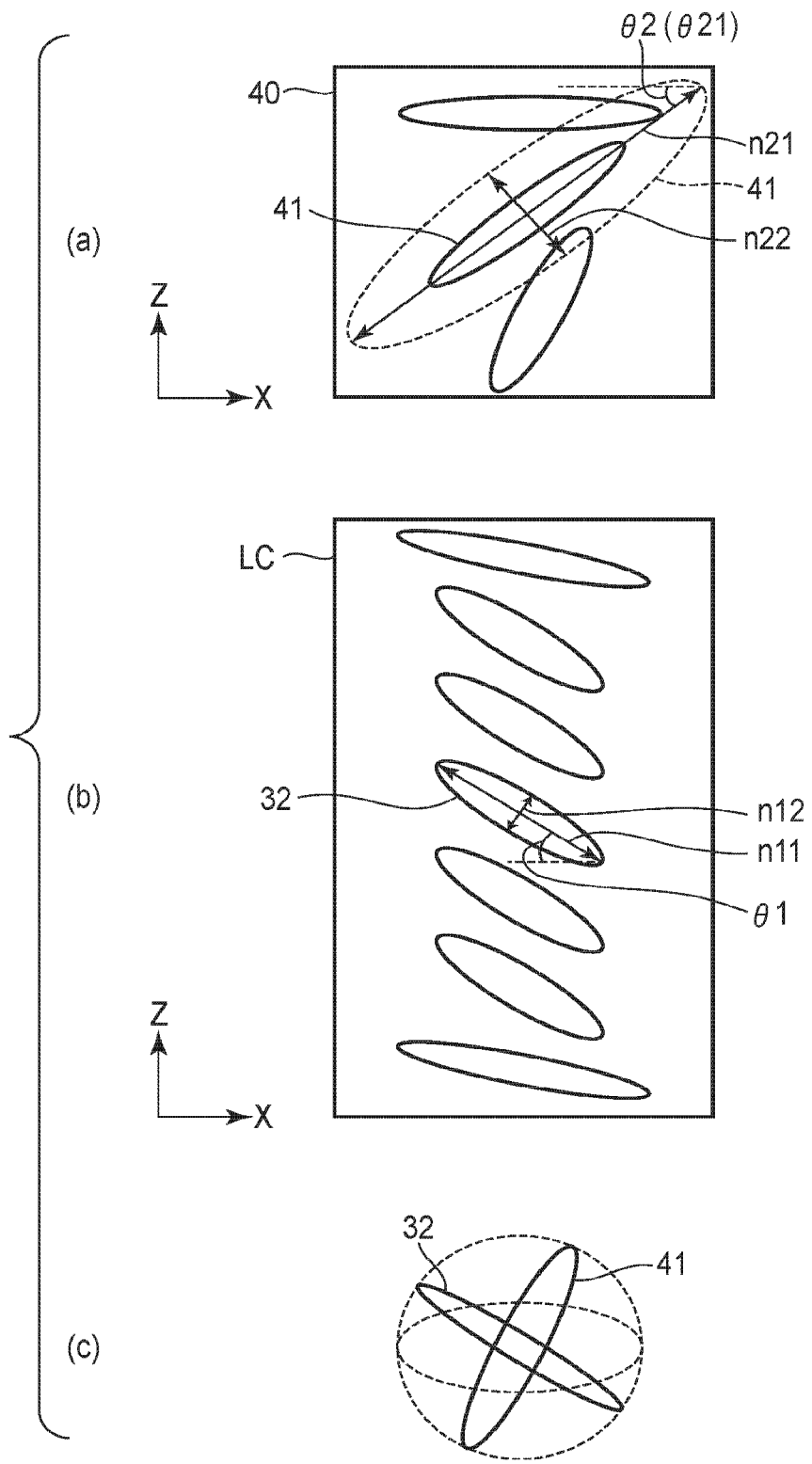
FIG. 7 is a schematic view showing an example of a cross section of the display device cut along line A-B shown in FIG. 5.
Figure 9:
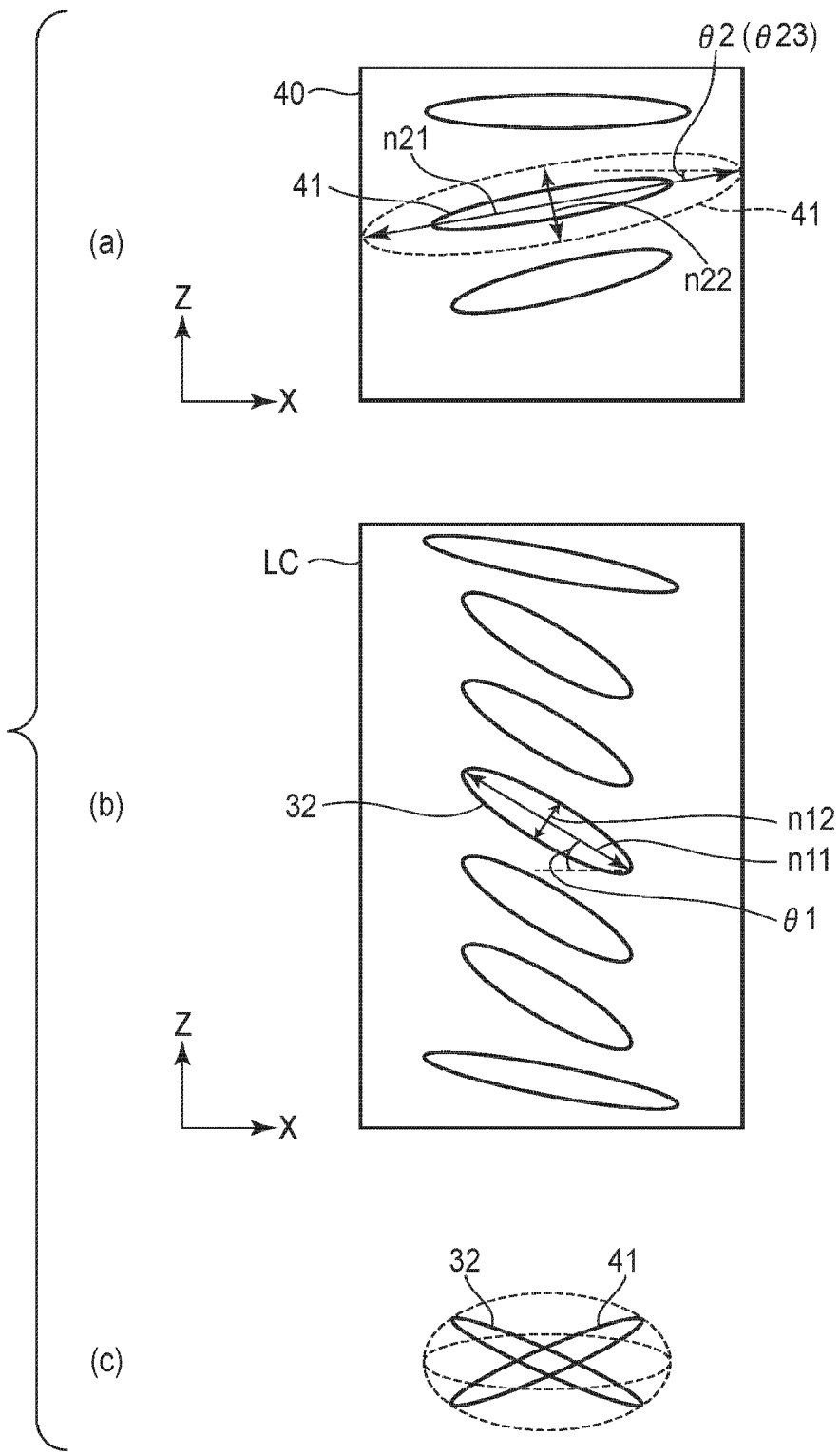
FIG. 9 is a schematic view showing an example of a cross section of the display device cut along line E-F shown in FIG. 5.

FIGS. 7 to 9 schematically show an example of cross sections of the compensation film 40 and the liquid crystal layer LC in regions when the region where the compensation film 40 is arranged is divided into three regions, i.e., a region close to the edge E32 on the opposite side to the light source LD (in other words, a region far from the light source LD (first region)), a region close to the intermediate portion of the edges E31 and E32 (in other words, an intermediate region (third region)), and a region close to the edge portion E31 on the light source LD side (in other words, a region close to the light source LD (second region)). In other words, the first region is a region separated from the light source LD, the second region is a region located between the light source LD and the first region, and the third region is a region located between the first region and the second region.

FIG. 7 is a diagram schematically showing an example of a cross section of the display device DSP cut along line A-B shown in FIG. 5. More specifically, FIG. 7(a) schematically shows an example of the cross section of the compensation film 40 in the region far from the light source LD, and FIG. 7(b) schematically shows an example of the cross section of the liquid crystal layer LC in the region far from the light source LD. In FIG. 7(b), illustration of the polymer 31 contained in the liquid crystal layer LC is omitted and only the liquid crystal molecules 32 are shown for convenience of description. In addition, FIG. 7(b) shows the liquid crystal molecules 32 in a state in which a voltage is applied to the liquid crystal layer LC.

FIG. 7(b) shows a state in which a voltage higher than or equal to the threshold value is applied to the liquid crystal layer LC. For this reason, as shown in FIG. 7(b), the liquid crystal molecules 32 contained in the liquid crystal layer LC have a first tilt angle (inclination angle) corresponding to the applied voltage and is inclined (tilted) to the transparent substrate 10. The first tilt angle corresponds to the angle between the major axis n11 of the liquid crystal molecule 32 and the horizontal plane of the transparent substrate 10 (i.e., the upper surface or the lower surface of the transparent substrate 10), and FIG. 7(b) shows an example that the first tilt angle is θ1. The major axis n11 and a minor axis n12 of the liquid crystal molecule 32 are orthogonal to each other.

As shown in FIG. 7(a), the compensation film 40 contains liquid crystal molecules 41 (second liquid crystal molecules) having no response to an electric field. Since the liquid crystal molecules 41 do not have the responsiveness to the electric field as described above, the aligned state does not change even if the same voltage as that in FIG. 7(b) is applied. In contrast, as shown in FIG. 7(a), the liquid crystal molecules 41 have a predetermined second tilt angle (inclination angle) and are inclined (tilted) to the upper surface of the compensation film 40, in the region far from the light source LD. The second tilt angle corresponds to the angle between the major axis n21 of the liquid crystal molecule 41 and the upper surface of the compensation film 40.

As shown in FIG. 7(a), the compensation film 40 includes a plurality of liquid crystal molecules 41 inclined with various second tilt angles θ2 in a region far from the light source LD, and the second tilt angle of the liquid crystal molecule 41 can be regarded as approximately θ21 as indicated by the dotted liquid crystal molecule 41. The liquid crystal molecule 41 inclined with the second tilt angle θ21 may be referred to as a liquid crystal molecule 41 having a high tilt angle. In addition, the second tilt angle θ21 is, for example, any angle included in the range of 60° or more and 90° or less. The major axis n21 and the minor axis n22 of the liquid crystal molecule 41 are orthogonal to each other.

The major axis n11 of the liquid crystal molecule 32 of the liquid crystal layer LC shown in FIG. 7(b) and the major axis n21 of the liquid crystal molecule 41 of the liquid crystal molecule 41 of the compensation film 40 shown in FIG. 7(a) are orthogonal to each other in cross section X-Z shown in FIG. 7. In addition, the minor axis n12 of the liquid crystal molecule 32 of the liquid crystal layer LC shown in FIG. 7(b) and the minor axis n22 of the liquid crystal molecule 41 of the liquid crystal molecule 41 of the compensation film 40 shown in FIG. 7(a) are orthogonal to each other in cross section X-Z shown in FIG. 7. In other words, the major axis n11 of the liquid crystal molecule 32 of the liquid crystal layer LC shown in FIG. 7(b) and the minor axis n22 of the liquid crystal molecule 41 of the liquid crystal molecule 41 of the compensation film 40 shown in FIG. 7(a) are parallel to each other in cross section X-Z shown in FIG. 7, and the minor axis n12 of the liquid crystal molecule 32 of the liquid crystal layer LC shown in FIG. 7(b) and the major axis n21 of the liquid crystal molecule 41 of the liquid crystal molecule 41 of the compensation film 40 shown in FIG. 7(a) are parallel to each other in cross section X-Z shown in FIG. 7.

A refractive index ellipse based on the liquid crystal molecules 32 contained in the liquid crystal layer LC shown in FIG. 7(b) and the liquid crystal molecules 41 contained in the compensation film 40 shown in FIG. 7(a) has a spherical structure as shown in FIG. 7(c), the refractive indexes of the first direction X, the second direction Y, and the third direction Z are the same, and the emitted light from the second substrate SUB2 of the display device DSP can be taken out isotropically. That is, it is possible to suppress the scattering brightness of the light L1 emitted from the light source LD in the traveling direction and increase the scattering brightness in the direction opposite to the traveling direction of the light L1 emitted from the light source LD (in other words, to average the scattering brightness of scattered light).

FIG. 8 is a diagram schematically showing an example of a cross section of the display device DSP cut along line C-D shown in FIG. 5. More specifically, FIG. 8(a) schematically shows an example of the cross section of the compensation film 40 in the intermediate region, and FIG. 8(b) schematically shows an example of the cross section of the liquid crystal layer LC in the intermediate region. Since it is assumed that the alignment of the liquid crystal molecules 32 contained in the liquid crystal layer LC is the same in the entire liquid crystal layer LC and that the voltage applied to the liquid crystal layer LC is also the same in the entire liquid crystal layer LC, FIG. 8(b) is the same drawing as FIG. 7(b) described above.

For this reason, as shown in FIG. 8(b), the liquid crystal molecule 32 contained in the liquid crystal layer LC has a first tilt angle $\theta 1$ and is inclined to the horizontal plane of the transparent substrate 10 similarly to the case shown in FIG. 7(b).

In contrast, as shown in FIG. 8(a), the liquid crystal molecule 41 has a second tilt angle $\theta 22$ smaller than the second tilt angle $\theta 21$ shown in FIG. 7(a) and is inclined to the upper surface of the compensation film 40, in the intermediate region. The liquid crystal molecule 41 inclined with the second tilt angle $\theta 22$ may be referred to as liquid crystal molecule 41 having a medium tilt angle. In addition, the second tilt angle $\theta 21$ is, for example, any angle included in the range of 30° or more and 60° or less.

The major axis n11 of the liquid crystal molecule 32 of the liquid crystal layer LC shown in FIG. 8(b) and the major axis n21 of the liquid crystal molecule 41 of the compensation film 40 shown in FIG. 8(a) intersect but are not orthogonal to each other in cross section X-Z shown in FIG. 8. In addition, the minor axis n12 of the liquid crystal molecule 32 of the liquid crystal layer LC shown in FIG. 8(b) and the minor axis n22 of the liquid crystal molecule 41 of the compensation film 40 shown in FIG. 8(a) intersect but are not orthogonal to each other in cross section X-Z shown in FIG. 8. More specifically, one (target angle) of angles formed by the major axis n11 of the liquid crystal molecule 32 and the major axis n21 of the liquid crystal molecule 41 shown in FIG. 8 (or the minor axis n12 of the liquid crystal molecule 32 and the minor axis n22 of the liquid crystal molecule 41) is smaller than 90°.

A refractive index ellipse based on the liquid crystal molecules 32 contained in the liquid crystal layer LC shown in FIG. 8(b) and the liquid crystal molecules 41 contained in the compensation film 40 shown in FIG. 8(a) does not have a spherical structure but has a disk-like structure as shown in FIG. 8(c), and the refractive index of the first direction X is larger, the refractive index of the second direction Y is equal, and the refractive index of the third direction Z is smaller as compared with the refractive index ellipse shown in FIG. 7(c).

FIG. 9 is a diagram schematically showing an example of a cross section of the display device DSP cut along line E-F shown in FIG. 5. More specifically, FIG. 9(a) schematically shows an example of the cross section of the compensation film 40 in the region close to the light source LD, and FIG. 9(b) schematically shows an example of the cross section of the liquid crystal layer LC in the region close to the light source LD. Since it is assumed that the alignment of the liquid crystal molecules 32 contained in the liquid crystal layer LC is the same in the entire liquid crystal layer LC and that the voltage applied to the liquid crystal layer LC is also the same in the entire liquid crystal layer LC, FIG. 9(b) is the same drawing as FIG. 7(b) and FIG. 8(b) described above.

For this reason, as shown in FIG. 9(b), the liquid crystal molecule 32 contained in the liquid crystal layer LC has a first tilt angle $\theta 1$ and is inclined to the horizontal plane of the transparent substrate 10 similarly to the case shown in FIG. 7(b) and FIG. 8(b).

In contrast, as shown in FIG. 9(a), the liquid crystal molecule 41 contained in the compensation film 40 has a second tilt angle $\theta 23$ smaller than the second tilt angle $\theta 22$ shown in FIG. 8(a) and is inclined to the upper surface of the compensation film 40, in the region close to the light source LD. The liquid crystal molecule 41 inclined with the second tilt angle $\theta 23$ may be referred to as a liquid crystal molecule 41 having a low tilt angle. In addition, the second tilt angle $\theta 23$ is, for example, any angle included in the range of 0° or more and 30° or less.

The major axis n11 of the liquid crystal molecule 32 of the liquid crystal layer LC shown in FIG. 9(b) and the major axis n21 of the liquid crystal molecule 41 of the compensation film 40 shown in FIG. 9(a) intersect but are not orthogonal to each other in plane X-Z shown in FIG. 9. In addition, the minor axis n12 of the liquid crystal molecule 32 of the liquid crystal layer LC shown in FIG. 9(b) and the minor axis n22 of the liquid crystal molecule 41 of the compensation film 40 shown in FIG. 9(a) intersect but are not orthogonal to each other in cross section X-Z shown in FIG. 9. More specifically, one (target angle) of angles formed by the major axis n11 of the liquid crystal molecule 32 and the major axis n21 of the liquid crystal molecule 41 shown in FIG. 9 (or the minor axis n12 of the liquid crystal molecule 32 and the minor axis n22 of the liquid crystal molecule 41) is smaller than 90° and is smaller as compared with the case shown in FIG. 8.

A refractive index ellipse based on the liquid crystal molecules 32 contained in the liquid crystal layer LC shown in FIG. 9(b) and the liquid crystal molecules 41 contained in the compensation film 40 shown in FIG. 9(a) does not have a spherical structure but has a disk-like structure as shown in FIG. 9(c), and the refractive index of the second direction Y is equal, but the refractive index of the first direction X is larger, and the refractive index of the third direction Z is smaller as compared with the refractive index ellipse shown in FIG. 8(c). That is, in the refractive index ellipse shown in FIG. 9(c), the refractive index in the second direction Y is equal, but the refractive index in the first direction X is larger and the refractive index in the third direction Z is smaller as compared with the refractive index ellipse shown in FIG. 7(c).

As described above, the display device DSP according to the present embodiment has a configuration that the upper surface of the cover member 30 is provided with the compensation film 40 containing the liquid crystal molecules 41 in which the second tilt angle θ2 becomes larger in a region farther from the light source LD. According to this, the following advantages can be obtained.

The advantages of the display device DSP according to the embodiments will be described below with reference to a comparative example. The comparative example is used to describe a part of the advantages that the display device DSP according to the embodiments can exert, and the common configurations and advantages in the comparative example and the embodiments are not excluded from the scope of the present invention.

Figure 10:
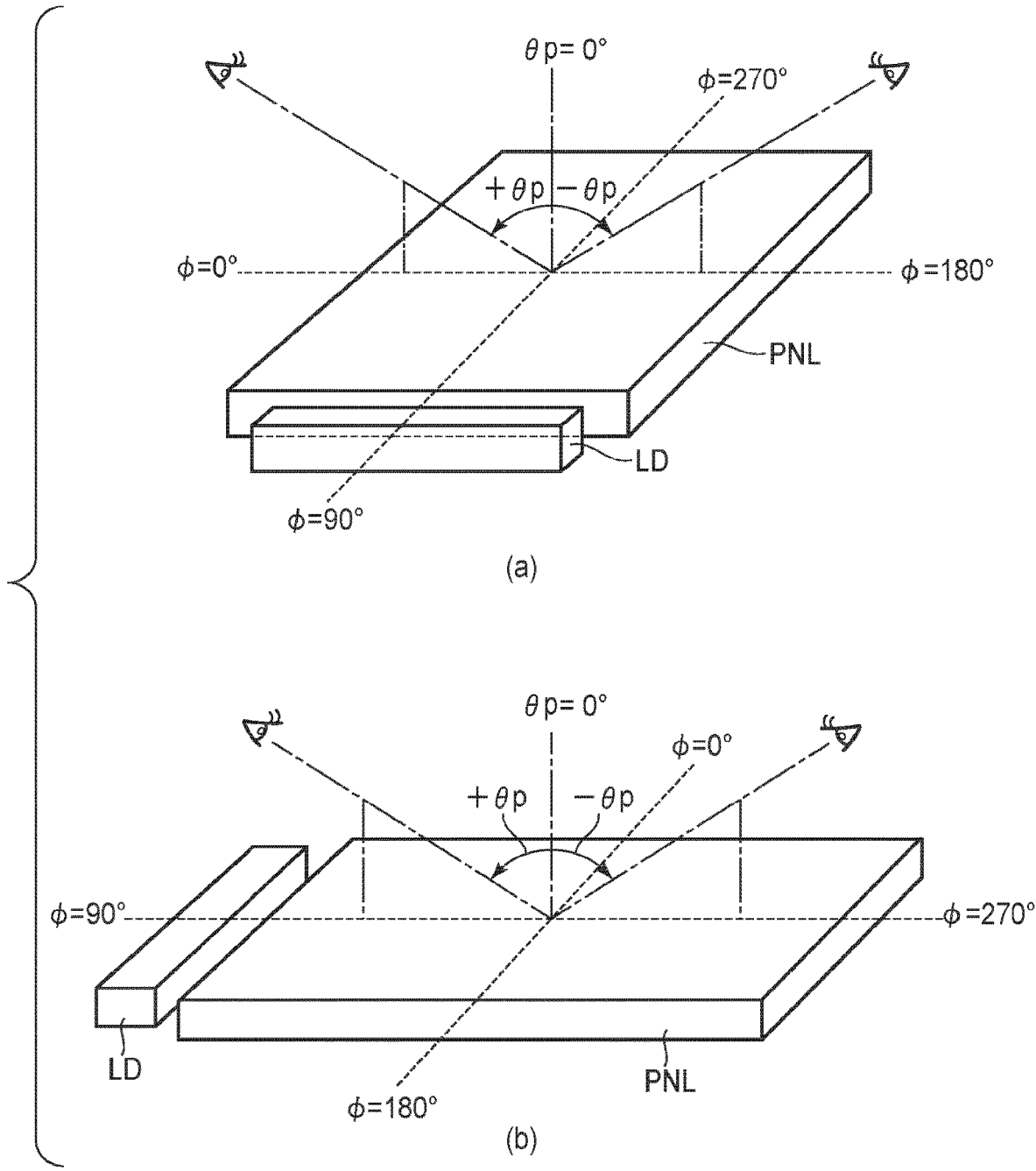
FIG. 10 is a diagram illustrating definitions of a polar angle and an azimuth in the display device according to the embodiments.

FIG. 10 is a diagram illustrating definitions of a polar angle θp and an azimuth φ in the display device DSP according to the embodiments.

As shown in FIG. 10(a) and FIG. 10(b), the polar angle θp corresponds to an angle formed between a normal and the observer's viewpoint where the normal of the display panel PNL of the display device DSP (i.e., the third direction Z) is used as a reference. The polar angle θp is an angle of 0° or more and 90° or less, and the polar angle θp counterclockwise from the above normal indicates a positive value and the polar angle θp clockwise from the above normal indicates a negative value.

In other words, the polar angle θp is an angle indicating the position of the observer's viewpoint, and indicates that the observer views the display panel PNL from the vertical direction when the polar angle θp is 0°, and the polar angle θp becomes larger as the angle at which the observer views the display panel PNL is inclined.

As shown in FIG. 10(a) and FIG. 10(b), the azimuth φ is an angle indicating the observer's observation orientation in plane X-Y. As shown in FIG. 10(a), when the azimuths φ are 0° and 180°, the angle indicates that the observer's observation orientation is directly beside the display panel PNL of the display device DSP. More specifically, when the azimuth φ is 0°, the angle indicates that the observer's observation orientation is on the left side of the display panel PNL in FIG. 10(a), and when the azimuth φ is 180°, the angle indicates that the observer's observation orientation is on the right side of the display panel PNL in FIG. 10(a). In contrast, when the azimuth φ is 90°, the angle indicates that the observer's observation orientation is on the light source LD side of the display device DSP in FIG. 10(a), and when the azimuth φ is 270°, the angle indicates that the observer's observation orientation is on the opposite side of the light source LD of the display device DSP in FIG. 10(a) (i.e., the traveling direction of the light emitted from the light source LD).

Figure 11:
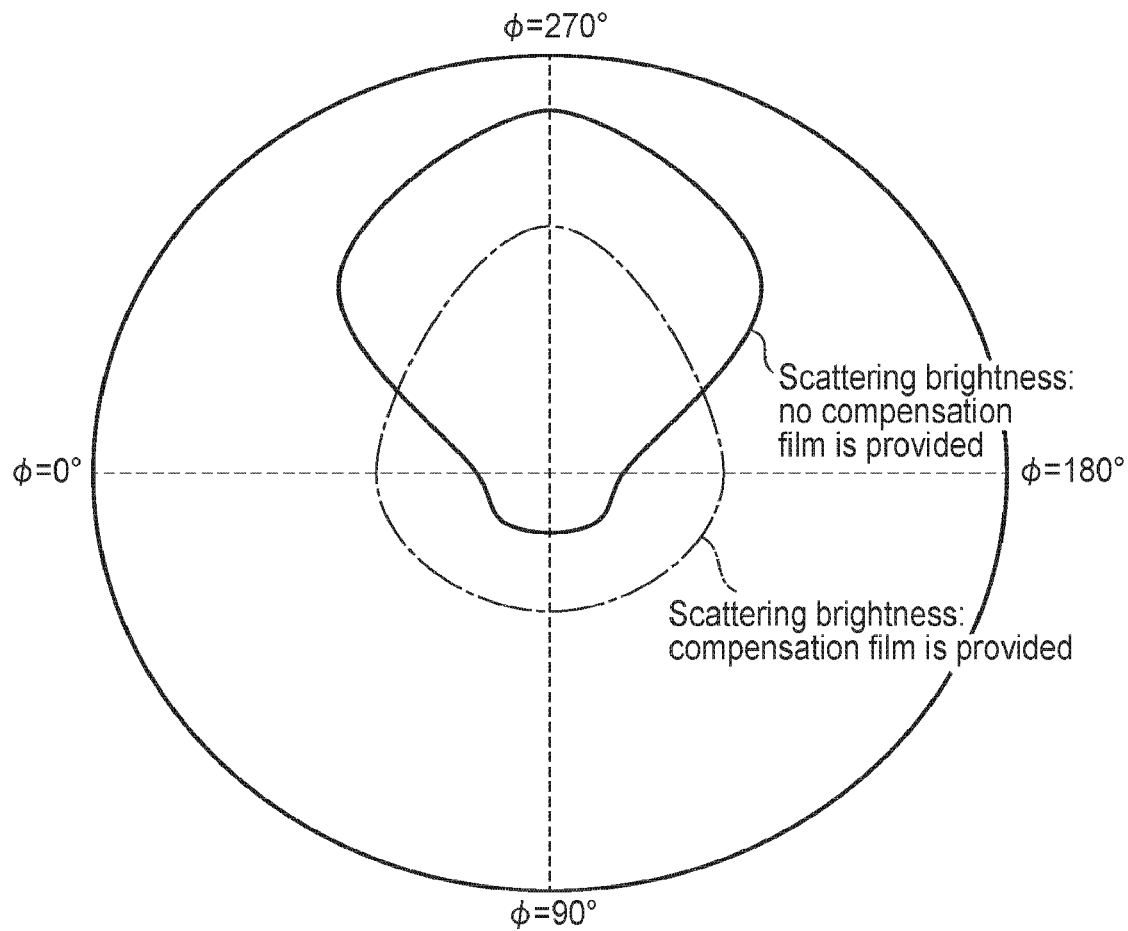
FIG. 11 is a graph schematically showing a change in scattering brightness in the display device according to the embodiments and the display device according to a comparative example.

FIG. 11 is a graph schematically showing a change in scattering brightness in the display device according to the comparative example and the display device according to the embodiments. The display device according to the comparative example is different from the display device DSP according to the embodiments in that the compensation film 40 is not provided on the emission surface of the scattered light. In FIG. 11, the change in the scattering brightness in the display device according to the comparative example is indicated by a solid line, and the change in the scattering brightness in the display device DSP according to the embodiments is indicated by a one-dot chain line.

In FIG. 11, it is assumed that the magnitude (absolute value) of the polar angle θp in the observation orientation indicated by the azimuth p is the same.

As described with reference to FIG. 4, the scattering brightness of the scattered light emitted from the display panel PNL has the characteristic of being higher in the traveling direction of the light emitted from the light source LD, and lower in the direction opposite to the traveling direction of the light emitted from the light source LD. For this reason, as indicated by the solid line in FIG. 11, the scattering brightness changes to be lower toward 90° orientation on the light source LD side and higher toward 270° orientation on the opposite side to the light source LD.

In addition, the scattering brightness also has a characteristic of being higher in the central region of the light source LD and lower in the wide-angle region of the light source LD. For this reason, as indicated by the solid line in FIG. 11, the scattering brightness changes to be lower toward 0° orientation and 180° orientation, and smaller toward the 0° orientation and 180° orientation, i.e., the central region (90° orientation and 270° orientation).

Thus, the display device according to the comparative example has a problem that, as indicated by the solid line in FIG. 11, a large difference in scattering brightness occurs depending on the observation orientation. According to this, a problem arises that the image looks bright or dark depending on the observation orientation.

In contrast, in the display device DSP according to the embodiments, since the film 40 comprising the liquid crystal molecules 41 inclined with the second tilt angle θ2 that is larger in a region farther from the light source LD and smaller in a region closer to the light source LD is provided on the emission surface of the scattered light, the scattering brightness in the traveling direction of the light emitted from the light source LD can be suppressed and, accordingly, the scattering brightness in the direction opposite to the traveling direction of the light emitted from the light source LD can be increased. That is, the display device DSP according to the embodiments can average the scattering brightness in each orientation as compared with the display device according to the comparative example, as represented by the one-dot chain line in FIG. 11.

Since the second tilt angle θ2 of the liquid crystal molecule 41 contained in the compensation film 40 is small in the region close to the light source LD, the scattering brightness in the traveling direction of the light emitted from the light source LD may not be able to be suppressed sufficiently and, as a result, the scattering brightness in the direction opposite to the traveling direction of the light emitted from the light source LD may not be able to be increased sufficiently, in the region close to the light source LD. In the region close to the light source LD, unlike the region far from the light source LD, however, since the light emitted from the light source LD is taken out in a state where it is hardly attenuated, the above-described problem can be solved even if the effect of the viewing angle compensation of the compensation film 40 is small.

Figure 12:
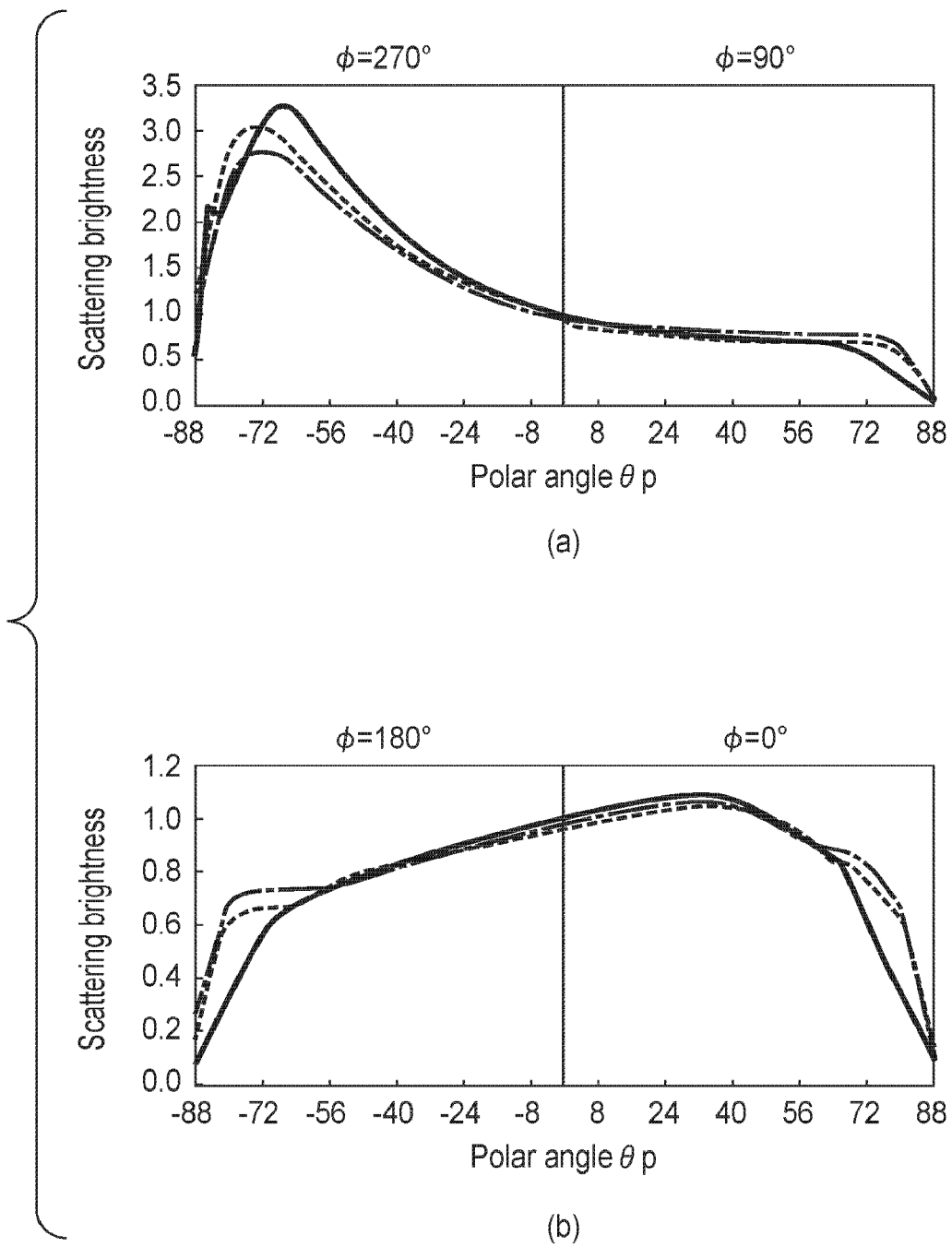
FIG. 12 is another graph schematically showing the change in scattering brightness in the display device according to the embodiments and the display device according to the comparative example.

FIG. 12 is a graph schematically showing the variation in scattering brightness, in the display device according to the comparative example, a display device DSP (hereinafter referred to as a first display device DSP) in which the compensation film 40 containing the liquid crystal molecules 41 inclined with the second tilt angle θ23 on the entire surface (uniformly) is arranged on the emission surface of the scattered light, and a display device DSP (hereinafter referred to as a second display device DSP) in which the compensation film 40 containing the liquid crystal molecules 41 inclined with the second tilt angle θ22 on the entire surface (uniformly) is arranged on the emission surface of the scattered light.

In FIG. 12, the variation in scattering brightness in the display device according to the comparative example is represented by a solid line, the variation in scattering brightness in the first display device DSP is represented by a dotted line, and the variation in scattering brightness in the second display device DSP is represented by a one-dot chain line. It is assumed that in FIG. 12, unlike FIG. 11, the azimuth φ at the position of the observer's viewpoint indicated by the polar angle θp is any of 0° orientation, 90° orientation, 180° orientation, and 270° orientation. That is, FIG. 12 shows the variation in scattering brightness in a case where the polar angle θp is varied in each of 0° orientation, 90° orientation, 180° orientation, and 270° orientation.

FIG. 12(a) shows the variation in scattering brightness depending on the position of the observer's viewpoint in 90° orientation and 270° orientation. It is focused that, for example, the magnitude of the polar angle θp in each orientation is approximately 72 (i.e., the polar angle θp=approximately±72°).

When the magnitude of the polar angle θp is approximately 72 in 270° orientation, the scattering brightness of the display device according to the comparative example is approximately 3.3 as represented by a solid line in FIG. 12(a), the scattering brightness of the first display device DSP is approximately 3 as represented by a dotted line in FIG. 12(a), and the scattering brightness of the second display device DSP is approximately 270° as represented by a one-dot chain line in FIG. 12(a). That is, when the positions of the observer's viewpoints are the same, the compensation film 40 is provided in 270° orientation, and the scattering brightness of the scattered light can be suppressed as the second tilt angle θ2 of the liquid crystal molecules 41 contained in the compensation film 40 is larger.

In contrast, when the magnitude of the polar angle θp is approximately 72 in 90° orientation, the scattering brightness of the display device according to the comparative example is approximately 0.7 as represented by a solid line in FIG. 12(a), the scattering brightness of the first display device DSP is approximately 0.9 as represented by a dotted line in FIG. 12(a), and the scattering brightness of the second display device DSP is approximately 1 as represented by a one-dot chain line in FIG. 12(a). That is, when the positions of the observer's viewpoints are the same, the compensation film 40 is provided in 90° orientation, and the scattering brightness of the scattered light can be increased as the second tilt angle θ2 of the liquid crystal molecules 41 contained in the compensation film 40 is larger.

Thus, when the compensation film 40 is arranged in the emission plane of the scattering light and as the second tilt angle θ2 of the liquid crystal molecule 41 contained in the compensation film 40 is larger, the scattering brightness in 270° orientation corresponding to the traveling direction of the light emitted from the light source LD can be suppressed and the scattering brightness in 90° orientation corresponding to the direction opposite to the traveling direction of the light emitted from the light source LD can be increased.

FIG. 12(b) shows the variation in scattering brightness depending on the position of the observer's viewpoint in 0° orientation and 180° orientation. It is focused that, for example, the magnitude of the polar angle θp in each orientation is approximately 72 (i.e., the polar angle θp=approximately±72°).

When the magnitude of the polar angle θp is approximately 72 in 180° orientation, the scattering brightness of the display device according to the comparative example is approximately 0.6 as represented by a solid line in FIG. 12(b), the scattering brightness of the first display device DSP is approximately 0.65 as represented by a dotted line in FIG. 12(b), and the scattering brightness of the second display device DSP is approximately 0.7 as represented by a one-dot chain line in FIG. 12(b). That is, when the positions of the observer's viewpoints are the same, the compensation film 40 is provided in 180° orientation, and the scattering brightness of the scattered light can be increased as the second tilt angle θ2 of the liquid crystal molecules 41 contained in the compensation film 40 is larger.

Similarly, when the magnitude of the polar angle Θp is approximately 72 in 0° orientation, the scattering brightness of the display device according to the comparative example is approximately 0.7 as represented by a solid line in FIG. 12(b), the scattering brightness of the first display device DSP is approximately 0.8 as represented by a dotted line in FIG. 12(b), and the scattering brightness of the second display device DSP is approximately 0.9 as represented by a one-dot chain line in FIG. 12(b). That is, when the positions of the observer's viewpoints are the same, the compensation film 40 is provided in 0° orientation, and the scattering brightness of the scattered light can be increased as the second tilt angle θ2 of the liquid crystal molecules 41 contained in the compensation film 40 is larger.

Thus, when the compensation film 40 is arranged in the emission plane of the scattering light and as the second tilt angle θ2 of the liquid crystal molecule 41 contained in the compensation film 40 is larger, the scattering brightness in 0° orientation and 180° orientation corresponding to the wide-angle region of the light source LD can be increased.

According to one of the above-described embodiments, the display device DSP comprises the compensation film 40 which is provided on at least one of the emission surface of the light emitted from the first substrate SUB1 side and the emission surface of the light emitted from the second substrate SUB2 side, and which contains the liquid crystal molecules 41 having no responsiveness to the electric field, and has characteristics that in the liquid crystal molecules 41 contained in the compensation film 40, the second tilt angle θ2 is large in the first region far from the light source LD and that the second tilt angle θ2 to the upper surface of the compensation film 40 is smaller than the first tilt angle θ2 in the first region, in the second region located between the light source LD and the first region. According to this, a display device capable of improving the display quality can be provided.

In the embodiments, the compensation film 40 contains the liquid crystal molecules 41 inclined with the second tilt angle θ21 in the region (first region) far from the light source LD, contains the liquid crystal molecules 41 inclined with the second tilt angle θ22 (θ22<θ21) in the intermediate region (third region), and contains the liquid crystal molecules 41 inclined with the second tilt angle θ23 (θ23<θ22 (θ23<θ21)) in the region (second region) close to the light source LD.

However, the compensation film 40 may also contain the liquid crystal molecules 41 having the second tilt angle θ2 that is larger as it is farther from the light source LD and the second tilt angle θ2 that is smaller as it is closer to the light source LD, even in each of the three divided regions. That is, the second tilt angle θ2 of the liquid crystal molecules 41 contained in the compensation film 40 may be continuously varied to gradually decrease from the region far from the light source LD to the region close to the light source LD.

More specifically, the compensation film 40 may contain the liquid crystal molecules 41 inclined with a second tilt angle $\theta 21a$ in a region far from the light source LD in the region far from the light source LD, may contain the liquid crystal molecules 41 inclined with a second tilt angle $\theta 21b$ ($\theta 21b<\theta 21a$) in an intermediate region in the region far from the light source LD, and may contain the liquid crystal molecules 41 inclined with a second tilt angle $\theta 21c$ ($\theta 21c<\theta 21b$) in a region close to the light source LD in the region far from the light source LD. Similarly, the compensation film 40 may contain the liquid crystal molecules 41 inclined with a second tilt angle $\theta 22a$ ($\theta 22a<\theta 21c$) in a region far from the light source LD in the intermediate region, may contain the liquid crystal molecules 41 inclined with a second tilt angle $\theta 22b$ ($\theta 22b<\theta 22a$) in an intermediate region in the intermediate region, and may contain the liquid crystal molecules 41 inclined with a second tilt angle $\theta 22c$ ($\theta 22c<\theta 22b$) in a region close to the light source LD in the intermediate region. Furthermore, the compensation film 40 may contain the liquid crystal molecules 41 inclined with a second tilt angle $\theta 23a$ ($\theta 23a<\theta 22c$) in a region far from the light source LD in the region close to the light source LD, may contain the liquid crystal molecules 41 inclined with a second tilt angle $\theta 23b$ ($\theta 23b<\theta 23a$) in an intermediate region in the region close to the light source LD, and may contain the liquid crystal molecules 41 inclined with a second tilt angle $\theta 23c$ ($\theta 23c<\theta 23b$) in a region close to the light source LD in the region close to the light source LD.

In addition, in the embodiments, the compensation film 40 is divided into, for example, three regions, and contains the liquid crystal molecules 41 inclined with different second tilt angles $\theta 2$ in the respective three regions. However, the compensation film 40 may contain the liquid crystal molecules 41 inclined with the same second tilt angle $\theta 2$ on the entire surface (entire region) thereof. In this case, the liquid crystal molecules 41 are desirably inclined with the second tilt angle $\theta 21$ that enables the scattered light to be taken out more isotropically.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A display device comprising:
a first substrate comprising a first transparent substrate, a scanning line, a signal line intersecting the scanning line, a switching element electrically connected to the scanning line and the signal line, and a pixel electrode electrically connected to the switching element;
a second substrate comprising a second transparent substrate and a common electrode opposed to the pixel electrode;
a liquid crystal layer held between the first substrate and the second substrate, and containing streaky polymer and a first liquid crystal molecule having responsiveness to an electric field;
a light source emitting light propagating inside the first substrate, the second substrate, and the liquid crystal layer; and
a transparent film arranged in at least one of an emission surface of light emitted from the first substrate side and an emission surface of light emitted from the second substrate side, and containing a second liquid crystal molecule having no responsiveness to the electric field,
in the second liquid crystal molecule, a tilt angle to a horizontal plane of the transparent film being large in a first region far from the light source, and the tilt angle to the horizontal plane of the transparent film being smaller than the tilt angle of the first region in a second region located between the light source and the first region.

2. The display device of claim 1, wherein
when the electric field occurs, a refractive ellipsoid based on the first liquid crystal molecule and the second liquid crystal molecule shows a spherical structure in the first region and shows a disk-like structure different from the spherical structure in the second region.

3. The display device of claim 1, wherein
tilt angles of a plurality of second liquid crystal molecules contained in each of the first region and the second region are gradually larger as the second liquid crystal molecules are separated from the light source.

4. The display device of claim 1, wherein
tilt angles of a plurality of second liquid crystal molecules contained in each of the first region and the second region are a first angle in the first region, and a second angle smaller than the first angle in the second region.

5. The display device of claim 1, wherein
a tilt angle of the second liquid crystal molecule contained in a third region located between the first region and the second region is smaller than a tilt angle of the second liquid crystal molecule contained in the first region and larger than a tilt angle of the second liquid crystal molecule contained in the second region.

6. The display device of claim 5, wherein
the tilt angle of the second liquid crystal molecule contained in the second region is an angle of 0° or more and 30° or less,
the tilt angle of the second liquid crystal molecule contained in the third region is an angle of 30° or more and 60° or less, and
the tilt angle of the second liquid crystal molecule contained in the first region is an angle of 60° or more and 90° or less.

7. A display device comprising:
a first substrate comprising a first transparent substrate, a scanning line, a signal line intersecting the scanning line, a switching element electrically connected to the scanning line and the signal line, and a pixel electrode electrically connected to the switching element;
a second substrate comprising a second transparent substrate and a common electrode opposed to the pixel electrode;

a liquid crystal layer held between the first substrate and the second substrate, and containing streaky polymer and a first liquid crystal molecule having responsiveness to an electric field;

a light source emitting light propagating inside the first substrate, the second substrate, and the liquid crystal layer; and a transparent film arranged in at least one of an emission surface of light emitted from the first substrate side and an emission surface of light emitted from the second substrate side, and uniquely containing a second liquid crystal molecule having no responsiveness to the electric field, a refractive ellipsoid based on the first liquid crystal molecule and the second liquid crystal molecule showing a spherical structure when the electric field occurs.

* * * * *